United States Patent [19]

Struss

[11] Patent Number: 4,565,366

[45] Date of Patent: Jan. 21, 1986

[54] MARTIAL ARTS PRACTICE DEVICE

[76] Inventor: Thomas G. Struss, Box 321, R.D. 4, Coatesville, Pa. 19320

[21] Appl. No.: 576,021

[22] Filed: Feb. 1, 1984

[51] Int. Cl.[4] ............................................. A63B 69/00
[52] U.S. Cl. .................................. 272/76; 272/DIG. 5
[58] Field of Search ...................... 272/76, 77, 78, 98, 272/130, DIG. 5; 273/55 R, 26 R, 374, 375, 376; 73/379, 380

[56] References Cited

U.S. PATENT DOCUMENTS

| | | | |
|---|---|---|---|
| 694,335 | 2/1902 | Thenan et al. | 272/76 |
| 2,680,967 | 6/1954 | Newman | 272/DIG. 5 |
| 3,427,021 | 2/1969 | Donato | 273/55 R |
| 3,578,324 | 5/1971 | Alvey | 273/55 R |
| 4,173,336 | 11/1979 | Perry | 272/76 |
| 4,199,141 | 4/1980 | Garcia | 273/376 |
| 4,365,800 | 12/1982 | Hay et al. | 272/76 |
| 4,390,181 | 6/1983 | Parish | 273/26 A |
| 4,432,545 | 2/1984 | Vanderpool | 272/76 |

Primary Examiner—Richard J. Apley
Assistant Examiner—S. R. Crow
Attorney, Agent, or Firm—Howson and Howson

[57] ABSTRACT

Accurate registration of the force of a blow delivered to a large-area padded target is achieved by supporting the target on a plurality of piston-and-cylinder units which are located outboard of the target outline. Resistance is provided by coil springs surrounding the pistons of the piston-and-cylinder units. Force is registered by a series of electrical switches operable by a stepped plate carried by the target. The switches actuate indicator lights through electronic delay circuitry which insures that blows, even though momentarily applied, are distinctly indicated.

10 Claims, 3 Drawing Figures

MARTIAL ARTS PRACTICE DEVICE

BRIEF SUMMARY OF THE INVENTION

This invention relates to targets for use in practice of martial arts, and more specifically to a target which is sufficiently large in size to simulate a human opponent and also capable of registering the force of a blow with which the target is struck.

It is not difficult to make a target of a size such as to simulate the head and upper torso of a human opponent. Nor is it difficult to make a small martial arts target which registers the force of a blow. However, so far as I am aware, no one has successfully made a force-registering martial arts target of a size large enough to simulate the head and upper torso of a human opponent.

One difficulty in making such a target results from the fact that blows delivered to different parts of the target, even though of equal force, are likely to be registered differently.

The principal object of this invention is to provide a simple yet rugged martial arts target which can be large enough to simulate a human opponent effectively, and which registers the force of blows delivered to it accurately regardless of the particular location on the target at which the blow is struck. In accordance with the invention, the foregoing objective is achieved by mounting the target on a support by means of a plurality of piston-and-cylinder units which are positioned near, and preferably external to the target outline. These piston and cylinder units constrain the target to linear movement without binding. Resistance is preferably provided by coil springs surrounding the pistons of the piston-and-cylinder units. Force is registered by a series of electrical switches operable by a stepped plate carried by the target. The switches actuate indicator lights through electronic delay circuitry which insures that blows, even though momentarily applied, are distinctly indicated by the indicator lights.

Various other objects and advantages of the invention will be apparent from the following detailed description when read in conjunction with the drawings.

DETAILED DESCRIPTION

Figure 1:
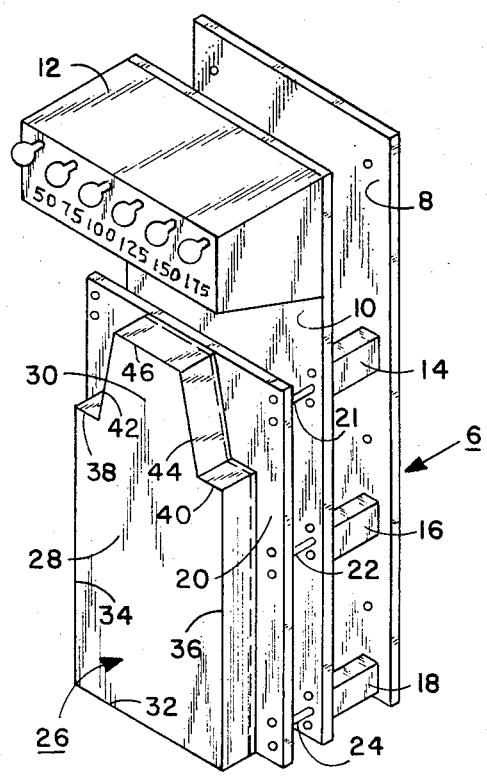
FIG. 1 is an oblique perspective view of a martial arts practice device in accordance with the invention.

As illustrated in FIG. 1, the martial arts practice device 6 comprises a stationary, wall-mountable wooden board 8, constituting a rear support. A second stationary board 10 is spaced forwardly from the wall-mountable board, and carries a force-indicator light assembly 12. Boards 8 and 10 are secured together by a vertical series of three metal blocks, 14, 16 and 18 on the right-hand side of the device, and by a similar series of metal blocks (not shown) on the left-hand side. As will become apparent, the metal blocks constitute the cylinders of piston-and-cylinder units on which the target is mounted. Boards 8 and 10, together with the blocks, form a rigid framework in which the blocks reinforce one another so that each is held rigidly in a fixed position.

A movable board 20 is supported on pistons 21, 22 and 24, which extend respectively into the cylinders within blocks 14, 16 and 18. Similar pistons (not shown) are provided on the left-hand side of the device.

A target 26 is mounted on board 20. The target consists of padding in an envelope of suitable covering material such as vinyl or a fabric such as canvas. The target simulates, both in size and in shape, the upper torso and head of a human opponent. The torso portion is indicated at 28, while the head portion is indicated at 30. A target outline, which is closed on itself, is formed by bottom edge 32, side edges 34 and 36 of the torso, shoulders 38 and 40, side edges 42 and 44 of the head and top 46 of the head. The height from edge 32 to edge 46 is approximately thirty six inches, while the width between edges 34 and 36 is approximately eighteen inches. The special target mounting system of the invention becomes significant whenever any dimension of the target transverse to the direction of impact exceeds about twelve inches.

The target is movable linearly in a direction parallel to the axes of the piston-and-cylinder units and perpendicular to boards 8, 10 and 20, all three of which are parallel. As the target moves, the outline of the target defines an imaginary cylindrical surface (i.e. a surface which is cylindrical in the general sense of a surface formed by movement of any closed curve in a straight direction through space). The axes of the piston-and-cylinder units are located near this imaginary cylinder, and preferably positioned to the exterior of the cylinder. Positioning of the axes of the piston-and-cylinder units in this way causes forces from a blow to any point on the target to be distributed to all six piston-and-cylinder units in the same direction, namely toward the rear support board 8. This prevents the piston-and-cylinder units from binding. Furthermore, the outboard positioning of the piston-and-cylinder units with respect to the target outline results in the distribution of forces such that a spring associated with each piston-and-cylinder unit absorbs part of the blow.

The piston-and-cylinder units are preferably designed to allow movement of the target through at least approximately three inches on maximum impact. The target likewise is designed to deform by at least approximately three inches on maximum impact. A very hard blow, therefore, may cause a total deformation of as much as six inches or more.

Various arrangements of piston-and-cylinder units can be used. However in each case there should be at least three units positioned so that an extension of the imaginary cylinder defined by movement of the target outline falls substantially completely within a multi-sided figure formed by straight lines connecting the axes of the piston-and-cylinder units. Minor portions of the target can extend outside the multi-sided figure without detrimental effect. In the case of FIG. 1, a minor portion of the target head extends above the line between the right and left upper piston-and-cylinder units, and a minor portion at the lower end of the target extends below the line between the right and left lowermost piston-and-cylinder units.

Figure 2:
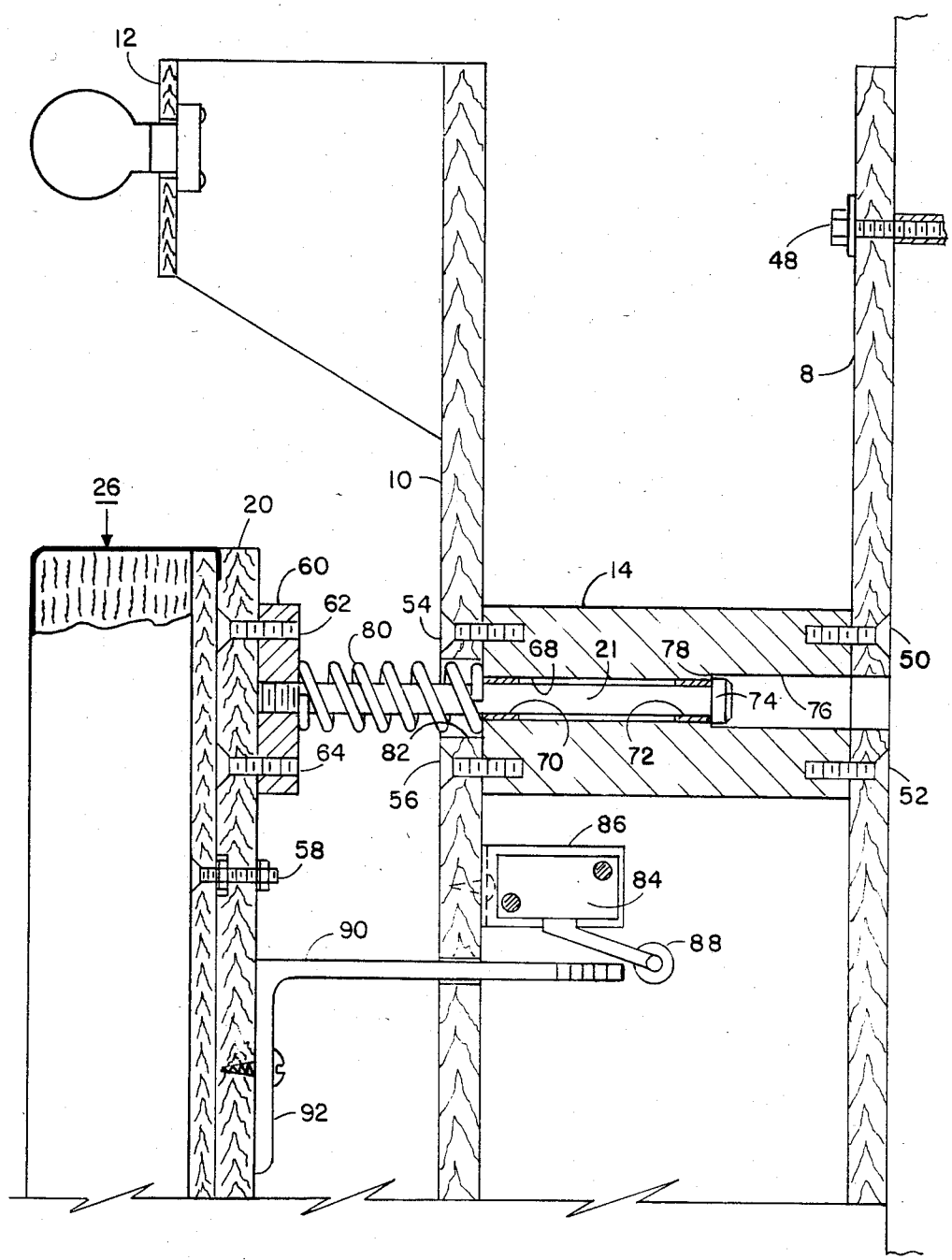
FIG. 2 is a vertical section taken through the upper portion of the martial arts practice device on a surface extending perpendicular to the face of the target and parallel to the direction of target movement.

As shown in FIG. 2, rear support board 8 is mounted to a wall by a number of bolts, one of which is shown at 48. Metal block 14 is secured between boards 8 and 10 by flat-head screws 50, 52, 54 and 56. Target 26 is mounted on movable board 20 by means of a number of screws, one of which is shown at 58.

A metal bar 60 is secured to board 20 by flathead screws 62 and 64. Bar 60 has a threaded opening which receives the threaded end of a bolt which constitutes piston 21. Piston 21 extends through cylindrical opening 68 within metal block 14, and slides in cylindrical bronze bushings 70 and 72. These bushings are spaced longitudinally along the axis of piston 21 in order to constrain the piston against tilting without causing excessive lateral forces to be applied to the bushings. Preferably, the outer ends of the bushings are spaced from each other by a distance of about six to eight times the diameter of the piston. While it is possible to use a single, elongated bushing, the use of two longitudinally spaced bushings effectively constrains the piston against lateral movement with less friction than would exist with a single elongated bushing.

Head 74 of piston 21 moves freely within cylindrical opening 76, which is larger than cylindrical opening 68, and which meets opening 68 at a shoulder 78. Normally, head 74 rests against shoulder 78, and thereby limits leftward movement of the target. A coil spring 80 is in compression between the right-hand face of bar 60, and the left-hand face of block 14. It extends into an opening 82 provided for it in board 10. The coil spring surrounds piston 21, and normally urges the target toward the left until head 74 of the piston contacts shoulder 78. The spring absorbs part of the force of a blow to the target, and resiliently resists movement of the target toward support board 8. Each of the five remaining piston-and-cylinder units is similar to the unit shown in FIG. 2.

Microswitch 84 is one of a series of six momentary, normally open, single throw, single pole microswitches. These microswitches are mounted side-by-side between brackets on board 10, one such bracket being indicated at 86. Microswitch 84 has a roller actuator 88, and the other microswitches (not shown) have similar actuators. A plate 90, having a flange 92 secured to board 20, extends through an opening in board 10, and has a stepped edge positioned for sequential actuation of the microswitches as the target moves inwardly under the force of a blow. The number of microswitches actuated would depend on the force of the blow. The more forceful the blow, the greater the number of switches actuated.

As an alternative arrangement, it would be possible to use an unstepped actuating plate with switches which are positioned for successive actuation.

Figure 3:
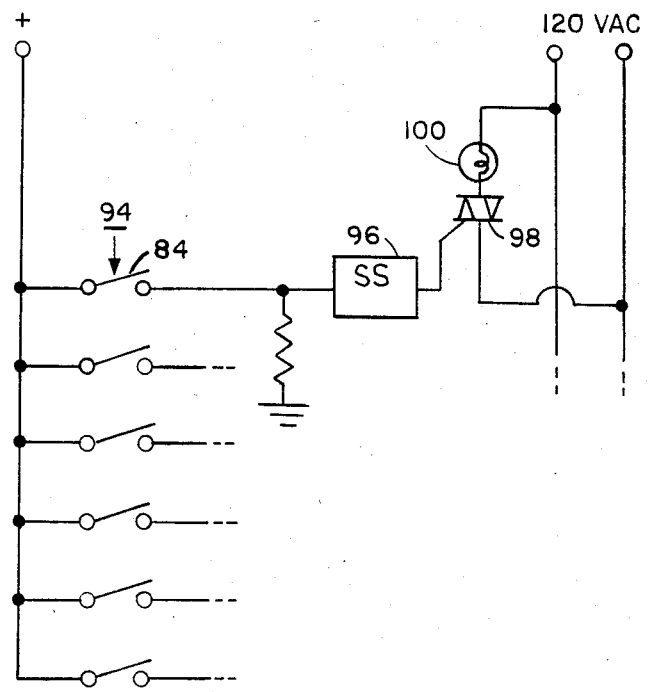
FIG. 3 is an electrical schematic illustrating the force indicator circuitry, including the delay means.

The series of microswitches is shown schematically at 94 in FIG. 3. Microswitch 84 is connected to a monostable multivibrator or "one-shot", the output of which is connected to trigger a triac 98. An indicator lamp 100 is connected in series with triac 98. A lamp actuator circuit similar to that connected to switch 84 is provided for each of the remaining switches in series 94.

Upon momentary closure of switch 84, monostable circuit 96 delivers a pulse of a predetermined duration to the gate of triac 98. The duration of the pulse depends on the parameters of an internal R-C timing circuit within monostable circuit 96. The pulse duration determines the duration of illumination of the indicator lamp 100, and can be of any desired length. A pulse duration of one-half second is ordinarily sufficient to insure a positive indication that a given force level has been reached. However, longer pulse durations can be used if desired.

The advantage of the indicator circuit just described is that, even if a switch is closed for only a very small fraction of a second, the corresponding indicator lamp will provide a positive indication that a force corresponding to that switch has been reached.

The martial arts practice device in accordance with the invention provides a reliable indication of the force of a blow, regardless of the location on the target at which the blow is struck. This result comes about primarily by virtue of the outboard location of the piston-and-cylinder units. The spaced bushings within the piston-and-cylinder units, and the mutual reinforcement of the cylinders, assist in providing reliable force indications.

Adjustment of the forces required to activate the indicator lights can be made by replacement of the coil springs, by replacement of switch actuator plate 90 by a plate having a different stepped configuration, or by providing for adjustment of the positions of the microswitches.

The number and positions of the piston-and-cylinder units can be modified. However, the piston-and-cylinder units, are preferably substantially aligned with the target outline or positioned outboard thereof for reliable operation and accurate force indication. The resistance to forces, while preferably and most conveniently provided by coil springs surrounding the pistons of the piston-and-cylinder units, can be achieved by springs in other positions and configurations. It is possible, for example, to eliminate the piston-and-cylinder unit consisting of piston 22 and cylinder block 16, as well as the corresponding middle unit on the left side of the target. If necessary for resisting impact forces on the target, these two piston-and-cylinder units can be replaced by simple spring-guiding rods or dowels secured to board 20 and extending through holes in board 10. Coil springs surround the guiding rods and are held in position thereby. The shape of the target can also be modified to suit the needs of the user.

Various other modifications can be made without department from the scope of the invention as defined in the following claims.

I claim:
1. A device for use in practice of martial arts comprising:
   a rear support;
   a padded target having a strikable front surface defined by an outline at least one of the transverse dimensions of which exceeds approximately twelve inches;
   means for mounting the target on the support and constraining the target to linear movement toward and away from the support;
   resilient means connected between the target and the support for resisting movement of the target toward the support; and
   means, actuable by movement of the target toward the support, for establishing at least three ranges of positions of the target and for indicating the maximum extent of movement of the target when struck, by indicating in which of said ranges the target is positioned at the point of its maximum degree of movement toward the support;
   in which the means for mounting the target on the support comprises at least three piston and cylinder units, each being located exteriorly with respect to the outline of the strikable front surface of the target and in which an extension of an imaginary cylinder defined by the target outline upon said linear movement of the target falls substantially completely within a multi-sided figure formed by straight lines connecting the axes of said piston and cylinder units.

2. A device according to claim 1 in which the piston of each piston-and-cylinder unit is rigidly secured to the target, and the cylinder of each piston-and-cylinder unit is rigidly secured to the rear support.

3. A device according to claim 1 in which the cylinder of each piston-and-cylinder unit includes two longitudinally spaced bushings, each having a cylindrical internal surface and in which the piston of each piston-and-cylinder unit extends through the bushings and has an exterior surface in sliding contact with the internal surface of the bushings.

4. A device according to claim 1 in which the resilient means comprises a coil spring surrounding the piston of each piston-and-cylinder unit, and being positioned so that it compresses when the target moves toward the support.

5. A device according to claim 1 in which the cylinder of each piston-and-cylinder unit comprises a stepped passage, and in which the piston of each piston-and-cylinder unit has a head engageable with the step of the passage of its cylinder for establishing a limit on movement of the target away from the support.

6. A device according to claim 1 in which the padded target is mounted on a board at least parts of which extend laterally beyond the outline of the strikable front surface of the target, and in which the piston and cylinder units are connected to said parts of the board.

7. A device according to claim 1 in which the means for establishing at least three ranges of positions for the target and for indicating the extent of movement of the target includes a plurality of momentary switches, means for actuating said switches successively as the target moves toward the support, an indicator light associated with each switch and electrically connected thereto for illumination of the light upon actuation of its associated switch, and electrical delay means, associated with each indicator light, for effecting continued illumination thereof for a predetermined time interval following actuation of its associated switch.

8. A device according to claim 1 in which the means for mounting the target on the support includes at least three piston-and-cylinder units on one side of the outline of the strikable front surface of the target, and at least three piston-and-cylinder units on the opposite side of the outline of the strikable front surface of the target.

9. A device according to claim 1 in which one end of the cylinder of each piston-and-cylinder unit is rigidly secured to the rear support, and including rigid means interconnecting the other ends of the cylinders with one another, whereby the cylinders mutually reinforce one another.

10. A device for use in practice of martial arts comprising:
    a rear support;
    a padded target having a strikable front surface defined by an outline;
    means for mounting the target on the support and constraining the target to linear movement toward and away from the support;
    resilient means connected between the target and the support for resisting movement of the target toward the support; and
    means, actuable by movement of the target toward the support, for indicating the extent of movement of the target;
    in which the means for mounting the target on the support comprises a plurality of piston and cylinder units, each being located near the outline of the strikable front surface of the target; and
    in which the means for indicating the extent of movement of the target includes a plurality of momentary switches, means for actuating said switches successively as the target moves toward the support, an indicator light associated with each switch and electrically connected thereto for illumination of the light upon actuation of its associated switch, and electrical delay means, associated with each indicator light, for effecting continued illumination thereof for a predetermined time interval following actuation of its associated switch.

* * * * *